March 27, 1951     L. B. KRAVETZ     2,546,825
ADJUSTABLE SCALE HOLDING DEVICE
Filed June 9, 1948

INVENTOR.
LOUIS B. KRAVETZ.
BY Howard J. Whelan.
ATTORNEY.

Patented Mar. 27, 1951

2,546,825

UNITED STATES PATENT OFFICE 2,546,825

ADJUSTABLE SCALE HOLDING DEVICE

Louis B. Kravetz, Baltimore, Md.

Application June 9, 1948, Serial No. 31,917

3 Claims. (Cl. 33—95)

This invention refers to measuring equipment and more particularly to that class known as surface gauges.

It is an object of the invention to provide a new and improved gauge that will avoid one or more of the disadvantages and limitations of the prior art.

Another object of the present invention is to provide a new and improved gauge that will be especially convenient to use without loss of accuracy or capacity to accomplish results.

A further object of this invention is to provide a new and improved gauge of structural design that will make it capable of withstanding relatively rough and continuous usage without detriment to its working parts.

Still another object of this invention is to provide a new and improved gauge that will be economical to manufacture and produce.

It is a further object of this invention to provide a device for holding a scale or rule in an upright position and manipulating it up and down a predetermined amount plus or minus without changing the position of the scale in the holding device but changing the height of the scale from the base on which the holding device is mounted.

Other objects will become apparent as the invention is more fully detailed.

For a more detailed understanding of this invention, its objects and the principles thereof, reference is made to the appended drawings the description following, wherein a particular form of the invention is disclosed by way of example, while the claims indicate its scope.

In the drawings.

Similar reference numerals pertain to the same parts throughout the different drawings.

The common way of setting the height of a surface gauge scriber for measurement or scribing a line in machine work is through the use of a scale held upright by hand. The scale is placed on the work plane to be gauged and the scriber adjusted to touch its point thereon. The surface gauge is then measured separately by a scale or rule placed against it longitudinally, until the right dimension can be read on the latter. This has several disadvantages, which may be partly overcome by a skilled user through the use of his visual judgement and experience. However this method is tedious and takes considerable time, comparatively. With an inexperienced craftsman, his determinations can be "off" considerably. These inaccuracies can be costly in many ways and result in unsuitable and ruined products. In this invention, the tool used employs a scale or rule assembled to a slider mounted on a base. It is used to take the measurements directly and without necessitating the removal of the tool from the work. This saves time and labor, and leads to more accurate measuring.

Figure 1:
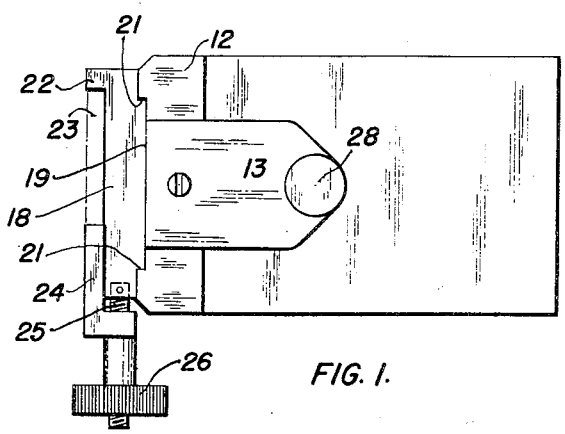
Figure 1 is a plan view of a depth gauge embodying this invention.
Figures 2, 3:
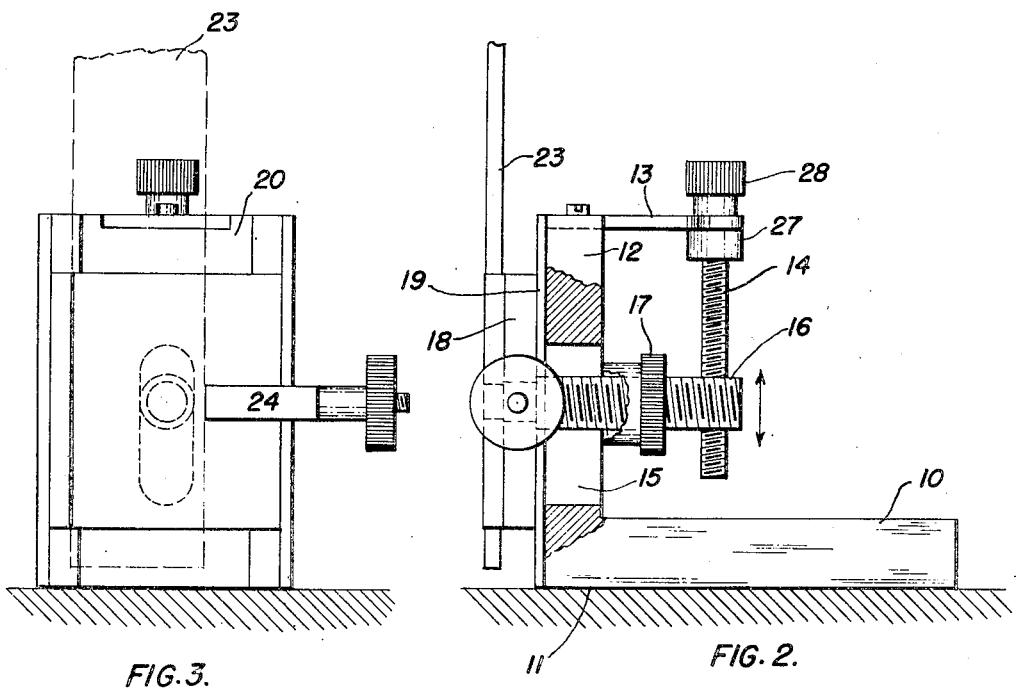
Figure 2 is a side elevation of Figure 1 partly in section.
Figure 3 is an elevation of the gauge looking in a direction from the front at right angles to Figure 2.

Referring to the particular structure in the drawings 10 represents a base, having its lower surface 11 accurately planed to rest level against a level surface. A side wall 12 extends at right angles from the base and serves as a means to support a bracket 13 and adjusting screw 14 therein. A longitudinal slot 15 in this wall 12 serves as a guide for the raising and lowering of a bolt 16 supported screw-threadably on the adjusting screw 14. The bolt 16 is clamped as it passes through the wall 12 by a knurled nut 17 screwing thereon on one side and a sliding plate 18 on the other against its outer surface 19. A groove 20 in the wall 12 engaged by a projecting shelf 21 keeps the plate 18 properly aligned as it is moved up and down. An outer lug or jaw 22 on the slider plate is projected at right angles to clamp on one side of a flat scale or rule 23. The opposite side of the scale 23 is likewise engaged by a loose clamp jaw 24, held to the plate 18 by a stud 25 and knurled sleeve 26 mounted over it, as shown. The stud is fastened to the plate 18 and is threaded tightly into the latter. The sleeve 26 is the movable part and when tightened up presses against the jaw 24 which in turn presses against the scale 23. The adjusting screw 14 extends down from the bracket 13 through a guiding collar 27 and is operated by a knurled head 28. The screw 14 does not move up and down, but remains stationary, that is, it is free of translation motion since it is freely rotatable in the collar 27. When it does rotate however, it screws into the bolt 16 so as to raise or lower the latter because of its threaded engagement therewith. The scale 23 is of conventional form with the graduations starting from the end edges so the measurements may be taken accurately therefrom. The device is used by placing the base 10 against the surface to be measured. Then the plate 18 is adjusted by operating the screw 14 to position the bolt 16 and plate 18 and scale 23. The bolt 16 is readily adjusted in the side wall 12 because of the slot 15 and its position calibrated to an accurate degree. The scale 23 is adjusted in between the jaws 22 and 24 by the operation of the stud 25. This may be done before or after the plate 18 is set in position. In the drawings, Figure 2 shows the device on a horizontal plane with the scale 23 about to be lowered against the plane and then tightened in place by the sleeve 26 acting on the jaws to clamp it. Further finer adjustment could be made by operating the adjusting screw 14, if desired. The groove 20 and shelf 21 keep the plate 18 in alignment and the scale rigid. The threads on the screw 14 are preferably about 40 threads per inch and similar to a micrometer and similar graduations can be placed on the bracket 13 and collar 27 to read the scale adjustments accordingly.

While but one general form of the invention is shown in the drawings and described in the specifications, it is not desired to limit this application for patent to this particular form, as it is appreciated that other forms of construction could be made that would use the same principles and come within the scope of the appended claims.

Having thus described the invention, what is claimed is:

1. A gauge comprising in combination, a base having its lower surface finished off for laying on a surface plate, a side wall extending at right angles from one side of said base, said side wall having an oblong slot therein, a bracket extending at right angles from said wall parallel to said base, an adjusting screw, means for mounting said screw on said bracket for rotation only, a second screw extending through said slot and in threaded engagement with said first screw and reciprocable thereon, a plate attached to said second screw and movable therewith, a scale, and means for holding said scale in adjustable relation to said surface plate for measuring its position with respect thereto.

2. In a gauge as set forth in claim 1, combined means on the plate for maintaining said second screw in predetermined alignment with said plate and for guiding said second screw during its reciprocations.

3. In a gauge as set forth in claim 1, the means for holding said scale comprising jaws to clamp the side of the scale and a manually operable friction member.

LOUIS B. KRAVETZ.

REFERENCES CITED

The following references are of record in the file of this patent:

UNITED STATES PATENTS

| Number | Name | Date |
|---|---|---|
| 1,023,144 | Fellay | Apr. 16, 1912 |
| 1,228,791 | Laubscher | June 5, 1917 |
| 1,324,963 | Hayes | Dec. 16, 1919 |
| 1,492,002 | Simanek | Apr. 29, 1924 |

FOREIGN PATENTS

| Number | Country | Date |
|---|---|---|
| 347,767 | Germany | Apr. 29, 1920 |
| 515,563 | Great Britain | Dec. 7, 1939 |